United States Patent [19]

Law

[11] Patent Number: 4,500,113

[45] Date of Patent: Feb. 19, 1985

[54] VEHICLE SUSPENSION SYSTEM

[75] Inventor: Denny B. Law, San Marcos, Calif.

[73] Assignee: Unique Functional Products, San Marcos, Calif.

[21] Appl. No.: 518,945

[22] Filed: Aug. 1, 1983

Related U.S. Application Data

[62] Division of Ser. No. 327,257, Dec. 3, 1981.

[51] Int. Cl.³ ............................................. B60G 11/22
[52] U.S. Cl. .................................................... 280/716
[58] Field of Search .................. 280/111, 112 R, 688, 280/690, 716

[56] References Cited

U.S. PATENT DOCUMENTS

| | | | |
|---|---|---|---|
| 1,765,764 | 6/1930 | Jett | 280/111 |
| 3,464,716 | 9/1969 | Butler | 280/716 |
| 3,481,623 | 12/1969 | Campbell | 280/716 |
| 3,608,926 | 9/1971 | Sprunger | 280/716 |
| 3,883,153 | 5/1975 | Singh et al. | 280/688 |
| 4,166,611 | 9/1979 | Geers et al. | 280/716 |
| 4,232,754 | 11/1980 | Corrigan et al. | 280/112 R |

Primary Examiner—Richard A. Bertsch
Attorney, Agent, or Firm—Duane C. Bowen

[57] ABSTRACT

Swing axles connected to a transverse rear axle housing by precision pivot assemblies formed in a pair of small vertical plates secured to front and back of the axle housing. Rubber pivot and spring members are received in the inverted U-shaped cross-section of the axle housing and have rests bearing on the middles of the swing axles. The rubber members form pivots for the swing axles and the rests accept fore and aft loadings of the swing axles.

14 Claims, 15 Drawing Figures

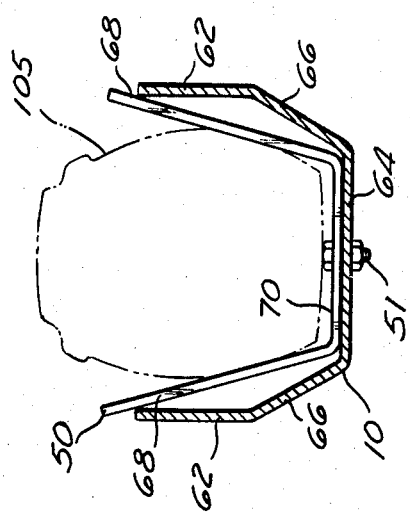
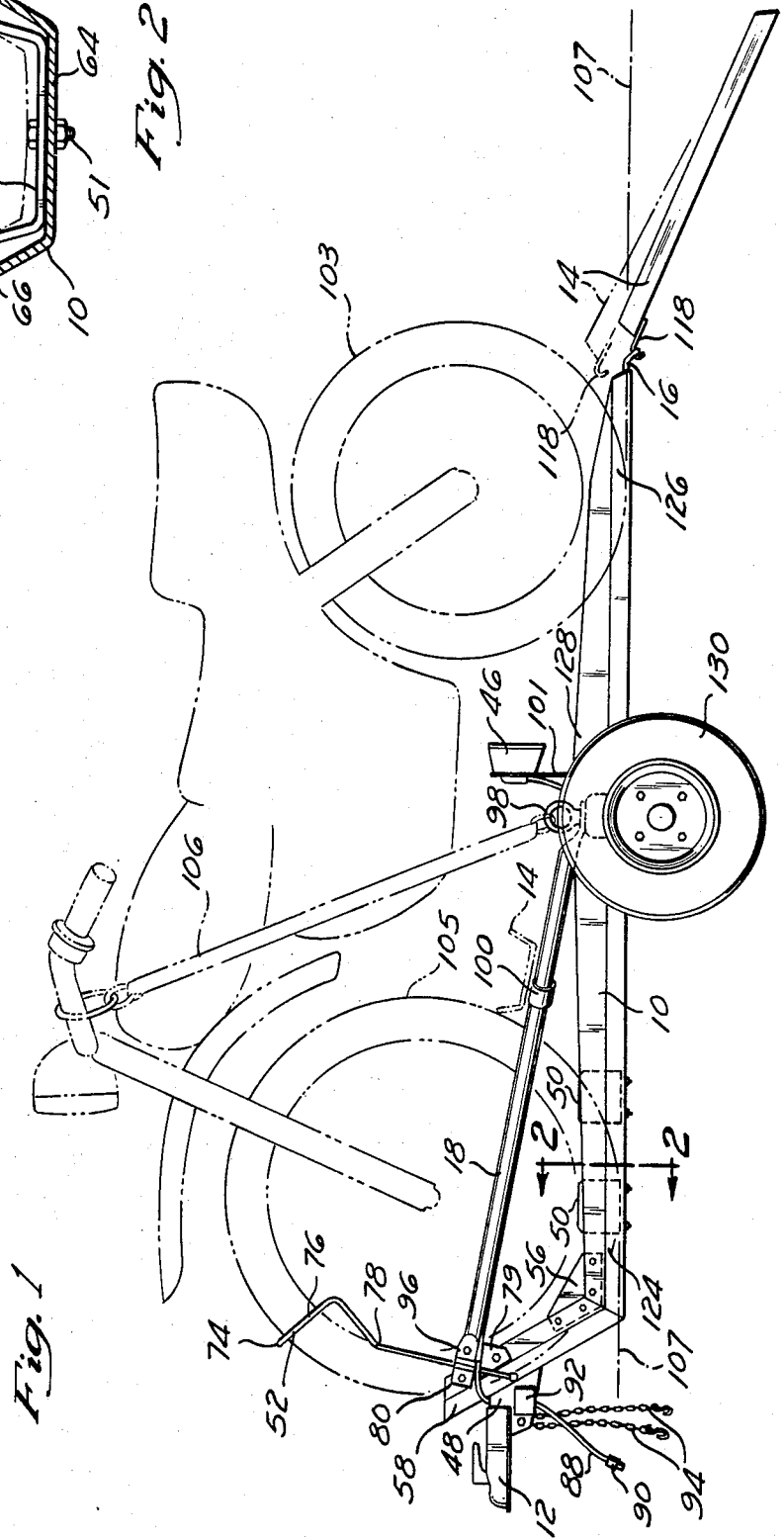

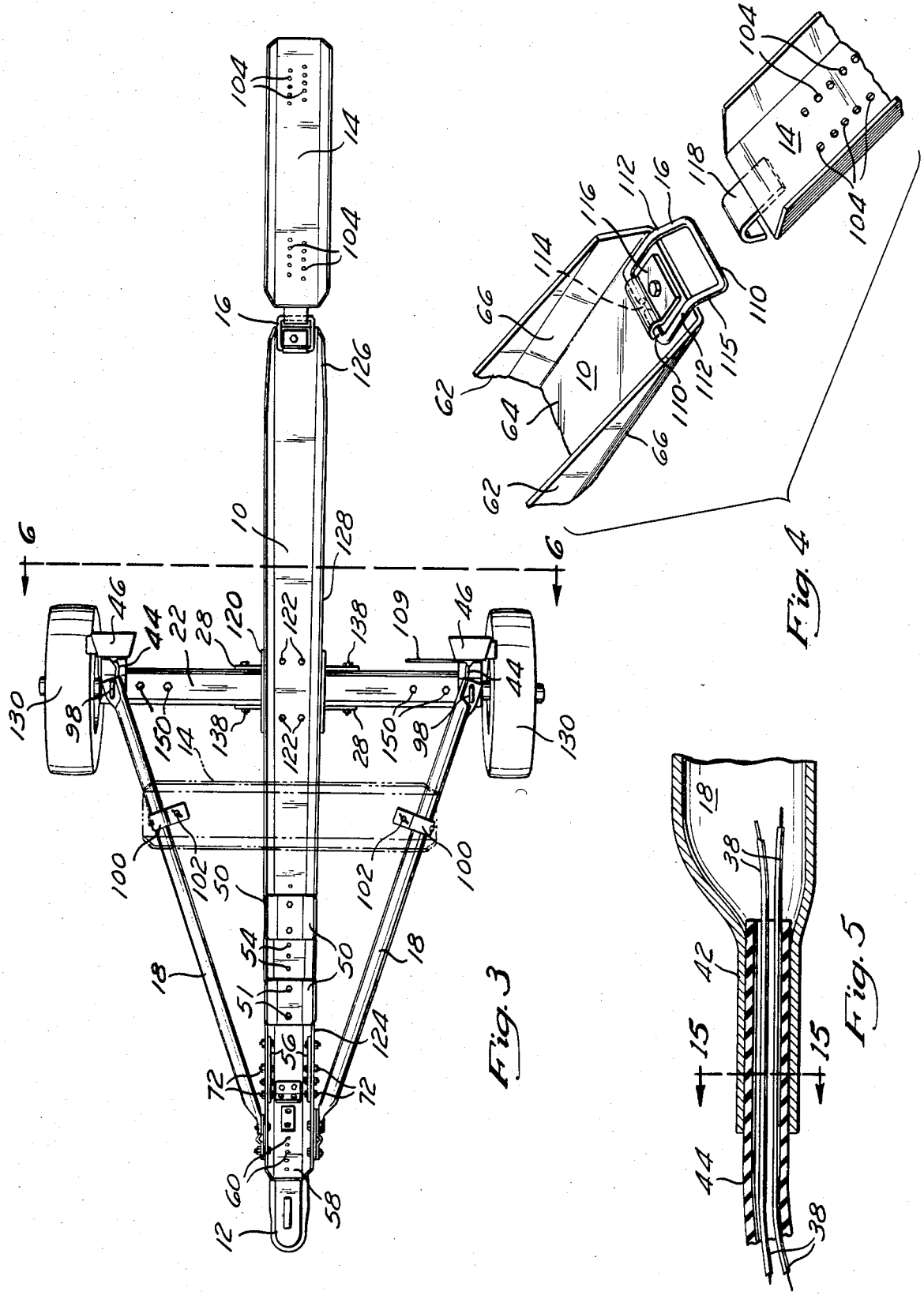

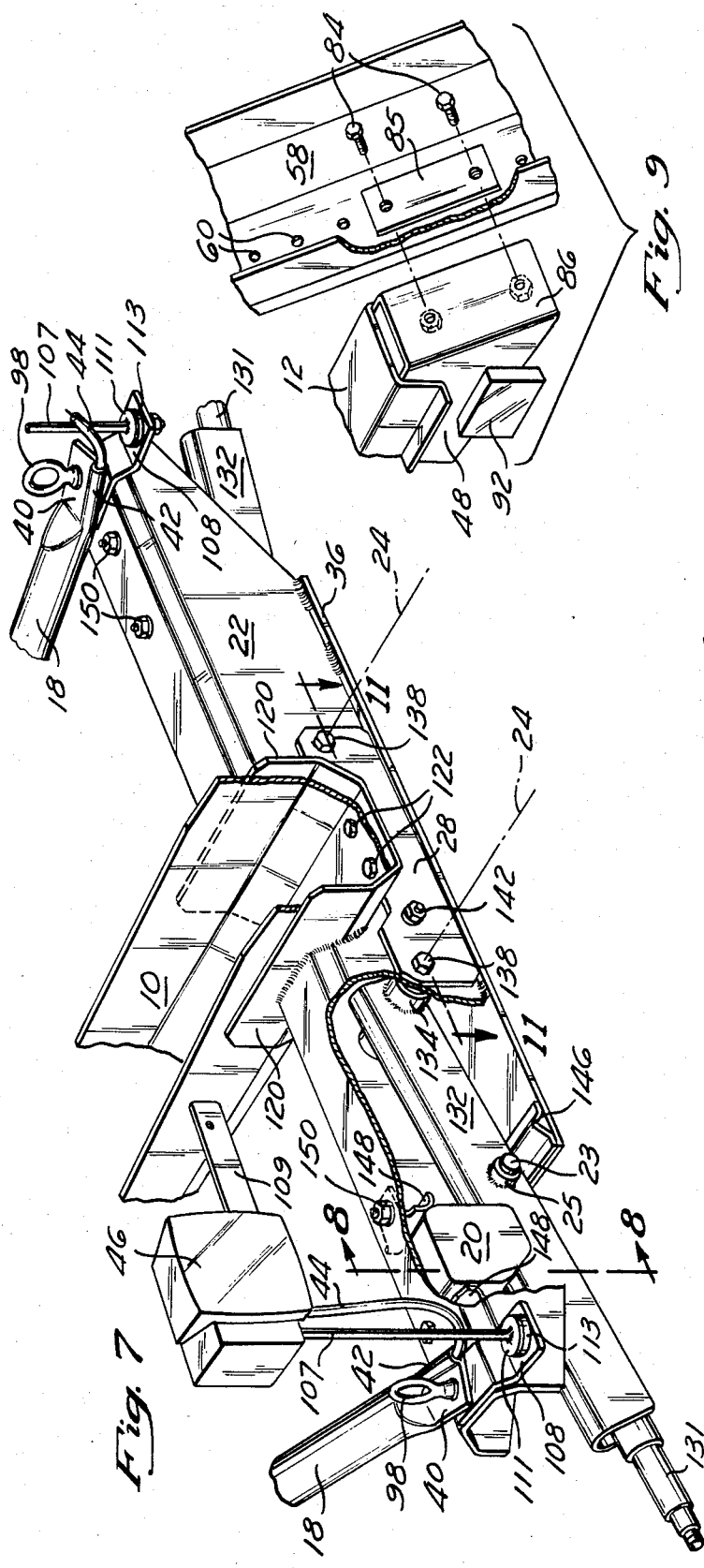

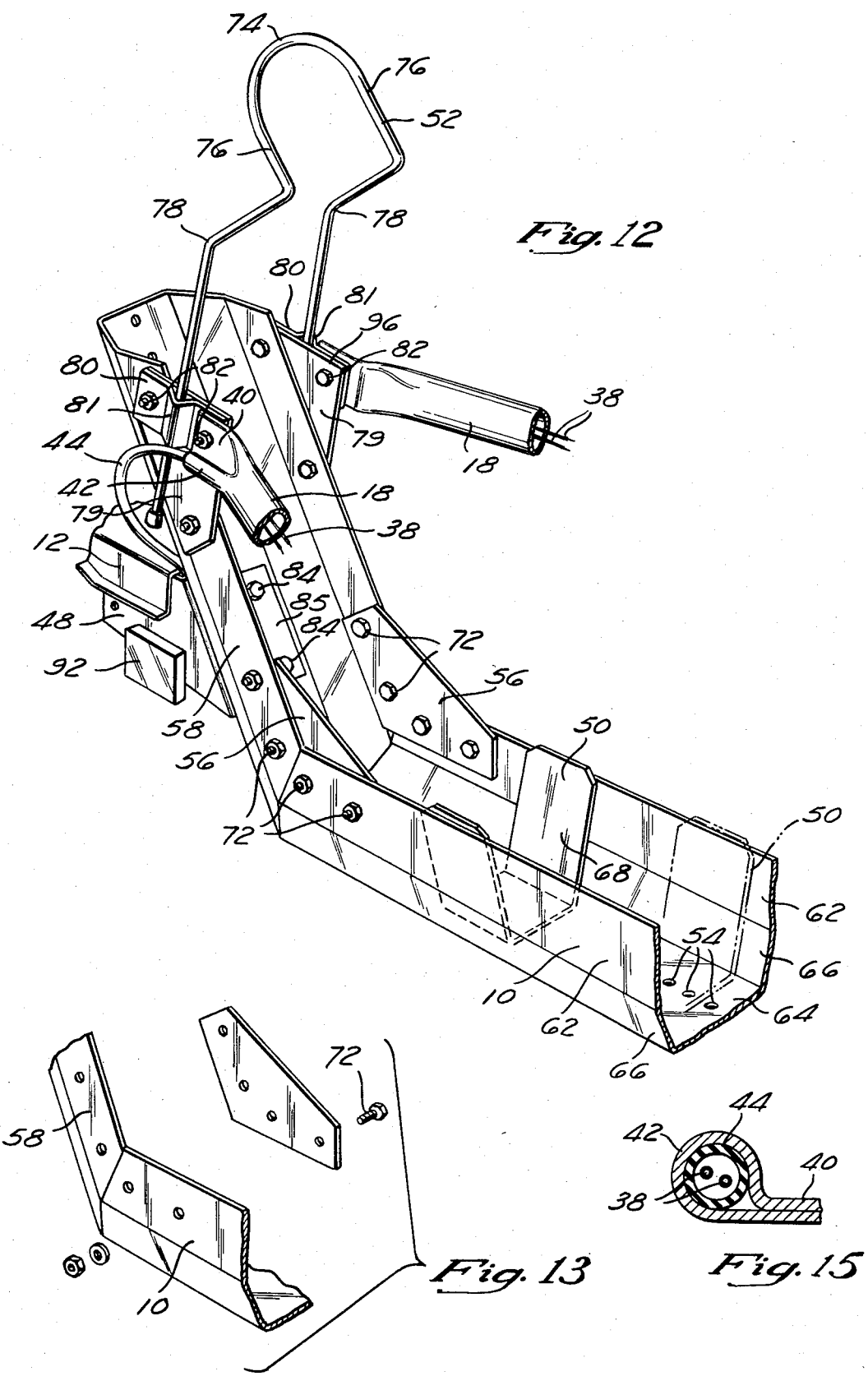

VEHICLE SUSPENSION SYSTEM

This application is a division of application Ser. No. 327,257, filed 12-3-81.

BRIEF SUMMARY OF THE INVENTION, BACKGROUND AND OBJECTIVES

My invention relates to improvements in trailers and, particularly, to improvements in motorcycle trailers or in structures useful in trailers for motorcycles or trail bikes.

A variety of names are currently used for motorized two-wheel vehicles. My trailer could be used to carry most two-wheel motorized vehicles, although it might only have minor use to carry a motorized bicycle, a scooter or a moped. For convenience in the specification and claims, I am only going to use the word "motorcycle" and define it to cover all applicable two-wheeled vehicles including the so-called touring, trail, street, enduro, racing, dirt, on-road, off-road, motocross, and mini motorcycles or bikes and also including mopeds, scooters and motorized bicycles.

A need was perceived for a trailer for transporting a motorcycle, which could be towed behind light-weight, low-powered modern automobiles. An additional need was perceived for such a trailer to be compact enough as to allow it storage vertically against a garage wall or on the floor of a garage with the motorcycle mounted on the trailer without monopolizing excessive floor space.

Conventional prior motorcycle trailers used one or more steel channel rails (troughs) into which a motorcycle could be mounted, supported on a metal frame which was supported by conventional, heavy leaf or "buggy" springs at each side and by a rigid axle. Since the frame width extended from wheel to wheel in the design of such trailers and saved little weight or cost by offering "single rail" (single motorcycle storage) construction, two or three rails were usually offered for little more weight and cost than single rail models. Such trailers typically weighed around 265 pounds. The tongue was typically a long, heavy-weight, three inch square steel tube connected to the front of the frame. The tongue needed to be long to prevent the front cross member on the trailer frame from striking tow vehicles bumper during turns. It is an objective of my invention to avoid disadvantageous features of prior motorcycle trailers.

My design goals and objectives include to:
1. Cut trailer weight and size drastically.
2. Maintain high strength to weight ratio.
3. Cut trailer length drastically.
4. Provide for accommodation of the trailer to various ball heights on the tow vehicle so that the trailer can be maintained level.
5. Provide for loading the motorcycle in a manner so that one person can push the motorcycle onto the trailer and so that he then can let go of the motorcycle and can use both hands to attach motorcycle tie-down straps, without the motorcycle tipping over.
6. Provide for containment and concealment of wires for lights so that wires are not exposed to view or damage and so that a neat, attractive appearance is presented.
7. Provide an overall stylish, attractive appearance.
8. Lower the trailer height drastically. This will allow for a shorter loading ramp (with a given ramp angle) and for a shorter axle. Lower trailer height allows for loading, in most instances, without use of the motorcycle's power.
9. Provide for an inexpensive, automatically progressive spring rate for the trailer's suspension system.
10. Provide independent wheel suspension (swing axles) without the extra weight and cost requirements inherent in conventional wishbone or tie rod designs, which are so constructed in order to stabilize the swing axles against fore and aft loading.
11. Provide for precision in the alignment of each swing axle with the other so that the centerlines of pivot for the swing axles are precisely parallel, but to do this in a way avoiding the expense of precision jig boring of pivot holes in a large axle support housing and also to provide the owner with simple, inexpensive replacement parts to restore original precison pivot axes should pivot holes become damaged.

In the past it has been common to provide a trailer for motorcycles substantially following the constructions of trailers for other purposes and essentially to merely put one or more troughs on top of a trailer chassis, to accommodate one or more motorcycles. The disadvantages of such prior trailers used for motorcycles include the following:

(a) The trailers were unnecessarily heavy and, consequently, unnecesssarily expensive.

(b) The motorcycle support structures were mounted behind a conventional tongue structure, although the positioning of the motorcycle behind the tongue was unnecessary.

(c) There was inadequate support of the motorcycle in the event of tie-down failures. Such failures resulted in the motorcycle tipping onto its side with consequent damage to both motorcycle and trailer.

(d) The trailers used buggy-springs below the motorcycle supporting structure. This meant the motorcycle was disposed unnecessarily high which, in turn, resulted in increased cost, difficulty in loading, and other disadvantages.

It is an objective of my invention to provide a trailer avoiding the disadvantages above listed. Further objectives include:

(a) To provide improved means to secure the motorcycle in place and improved ramp means to load the motorcycle.

(b) To devise means to adjust to the level of the fixture attached to the towing vehicle, so that the motorcycle can be maintained level regardless of the height of those fixtures.

(c) To provide an economical swing axle structure having all functions including the spring function commonly provided in prior motorcycle trailers in the form of so-called "buggy springs".

(d) To provide wiring for lights on the trailer which are housed in a manner not detracting from the appearance of the trailer.

When the expression "ball coupler" is used I mean the term to cover equivalent ways to couple between a trailer and a towing vehicle if some other type of hitch is used.

My invention will be best understood, together with additional objectives and advantages thereof, from the following description, read with reference to the drawings.

FIGURE DESCRIPTIONS

FIG. 1 is a side view of a trailer, showing a specific embodiment of my invention. In phantom lines, a motorcycle is shown mounted on the trailer. A ramp is shown in loading position in full lines and in transportation position in dashed lines.

FIG. 2 is an enlarged view, partly in section, taken on line 2—2 of FIG. 1.

FIG. 3 is a top view of the same structure viewed in FIG. 1.

FIG. 4 is an enlarged fragmentary view, in perspective, showing the attachment of the ramp to the motorcycle-receiving trough.

FIG. 5 is an enlarged view, partly in section, shown in the entry of wiring and of a rubber tubing housing the wiring into a tube brace through a tubular passageway formed in the flattened end of the tube brace.

FIG. 6 is an end view taken on line 6—6 of FIG. 3.

FIG. 7 is an enlarged perspective view showing particularly details of the swing axle assemblies.

FIG. 8 is a view partly in section taken on line 8—8 of FIG. 7.

FIG. 9 is a fragmentary exploded view showing the adjustable height attachment of the ball coupler to the forward end of the motorcycle supporting trough.

FIG. 12 is a perspective view of portions of the structure at the forward end of the trailer.

FIG. 13 is a perspective view of portions of the gusset plate assembly.

FIG. 15 is an enlarged view, partly in section, taken on line 15—15 of FIG. 5.

SPECIFIC DESCRIPTION

Figure 10:
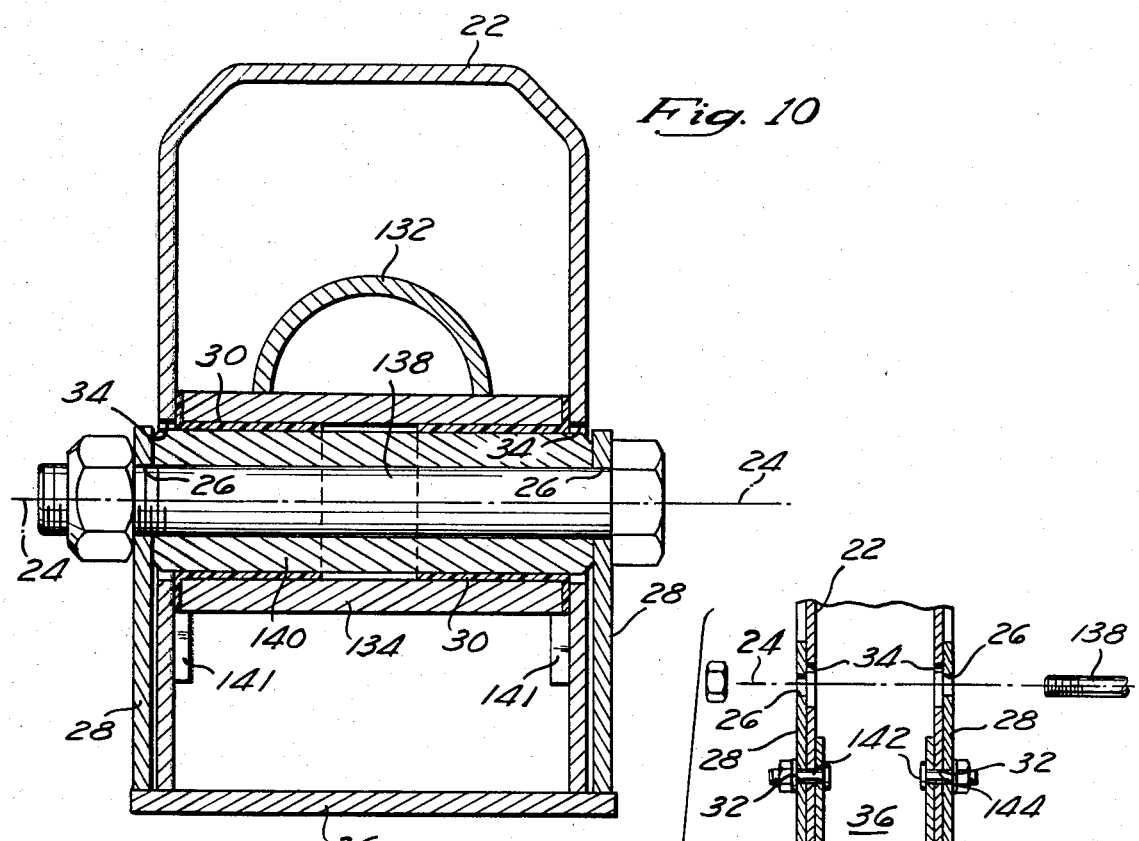
FIG. 10 is an enlarged view, partly in section, taken on line 10—10 of FIG. 6.
Figure 11:
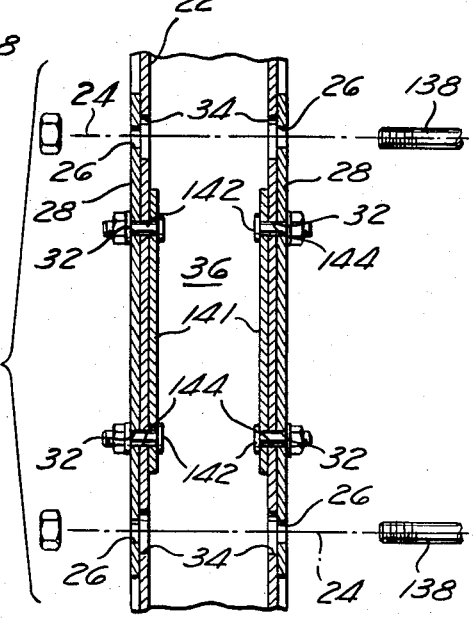
FIG. 11 is a view taken on line 11—11 of FIG. 7, of portions of the axle housing, of the plates abutted to the sides of the housing, of the openings through these members, and the bolts to be installed in those openings.
Figure 14:
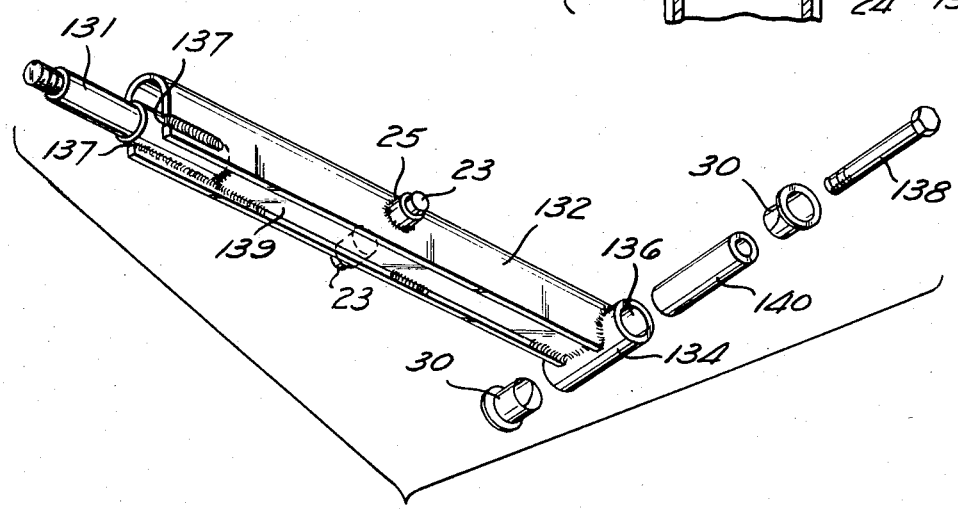
FIG. 14 is a perspective exploded view of parts of the swing axle.

The prototype of this product was adapted to accommodate all known trail bikes and all but the largest and heaviest street motorcycles. Somewhat larger dimensions would be needed to accommodate the largest road motorcycles, to the extent a trailer would be desired for that type of motorcycle. It will be understood that commonly a trail motorcycle will be towed on a trailer behind a vehicle to some area where it is desired to cycle on trails, whereas usually there is no reason to carry road motorcycles on a trailer anyplace as they are adapted primarily to be used on the roads themselves. That is not invariably true. For example, any type of cycle may be towed behind a recreational vehicle to provide transportation once the recreational vehicle is changed from one area to another area. Another example would be a cycle taken to another location for racing. On occasion a trailer may be used to transport cycles as light as mopeds or even an unpowered bicycle, although that would be unusual. The bulk of motorcycle trailer market is for trail motorcycles.

I have achieved the above-listed design goals by the following means:

1. Utilized the tongue itself as the motorcycle rail or trough 10.

2. Shortened trough 10 so that the front of the motorcycle is mounted as close as possible to the ball coupler 12. To do this, it is necessary to utilize a "pointed" trailer design (in plan view) so that the tow vehicle bumper is not struck by any part of the trailer during turns.

3. Shortened trough 10 so that the aft end of the trough does not extend unnecessarily aft of the rear motorcycle tire 103. Compliance with this criterion means that there may be no appreciable space between the rear motorcycle tire 103 and the bottom of trough or rail 10 to allow for connection of the loading ramp to the rail. Therefore, I have devised means allowing connection of loading ramp 14 to trough 10 in spite of the aft end of trough 10 being covered by motorcycle tire 103. A connecting line 16 is provided which extends to the ramp connection point and well below trough 10 so as to keep the connection point clear of motorcycle tire 103. To prevent link 16 from being damaged in the event it strikes anything on the road, it is pivoted in such a manner that it carries the down load of ramp 14 during loading but is free to swing upwards if impacted by rocks, etc., on the road during travel.

4. Tapered trough 10 to take advantage of the fact motorcycles have narrow front wheels 105 and wide rear wheels 103.

5. Utilized a modified channel section instead of a standard channel section to form trough 10. This allowed the channel to more closely fit the motorcycle tires 103, 105 and provided a higher strength to weight ratio because of its shape.

6. Did not attempt to provide for required torsional stiffness in trough 10 itself, but instead used light weight braces 18 external to trough 10 to achieve torsional stiffness.

7. Used rubber members 20 as spring functions in the swing axle assemblies.

8. Shaped each rubber member 20 so that as the rubber is compressed by the corresponding swing axle the area of rubber member 20 under compression increases as axle loading increases. Each rubber member 20 provides an inexpensive, automatically progressive spring rate for the corresponding swing axle.

9. Located each rubber member 20 in a structural axle housing 22 sufficiently far from the axle swing center and shaped rubber member 20 so that under load the rubber, supported by housing 22, transmits fore and aft resistance forces to the corresponding swing axle to oppose fore and aft loads applied to the swing axle by road irregularities, hazards, etc. When such fore and aft loads are excessive, additional support is provided by stabilizer plugs 23. Stabilizer plugs 23 can be formed of a suitable material, such as a plastic (Nylon or equivalent). Plugs 23 are housed in rings 25 secured to swing axles 132 and transmitting deflecting loads to the sidewalls of the inverted U-shaped cross-section of structural axle housing 22.

10. Maintained precise parallelism between the two axle pivot centerlines 24 by jig boring a precision bolt hole 26 in each end of a small rectangular plate 28. A pair of these plates 28 are bolted together through the jig drilled holes 26 at each end of plates 28 with a bushing 140 acting as a spacer at each bolt hole 26. These two simple plates 28 are bolted to the trailer through "sloppy" fit (generous tolerance) holes 32. The holes 34 through housing 22 at the pivot point are also "sloppy" fit holes. The axle loads are transmitted to the trailer from the axle to the precision bolt through the bushing to the small rectangular plates 28 and thence by abutment to a horizontal plate 36 welded to the bottom of housing 22.

11. The two braces 18 also house elecctrical wiring 38. At each end of each brace 18, where it is flattened at 40 for bolt connection, a tubular passageway 42 is formed. A rubber hose 44 acting as a wiring conduit, can be pushed snugly through passageway 42 to make the proper length of hose 44 (housing wiring 38) protruding from the brace 18. A neat, good looking connection is thus provided to a rear light 46 at the aft end of each tube 18 and to the junction area in a member 48 at the forward end of each tube 18. Excess wiring 38 and rubber conduit 44 are simply pushed into tube braces 18 thus allowing easy accommodation of wiring 38 to various heights of the tongue piece 48 with the wiring always looking neat.

12. Provided "wedge" pieces 50 mounted inside trough 10 where they will automatically "wedge" various diameters of motorcycle front tires 105. Provided a clamp 52 for the upper, forward part of the motorcycle front tire 105, which can be adjusted to fit various motorcycle front tires 105. These two devices effectively hold the motorcycle from falling during the tie-down process.

13. Trailer "bow" piece 58 bolted to the front end of trough 10 has a row of mounting bolt holes 60 in the front face of "bow" piece 58 such that member 48 may be moved up or down on the bow piece 58 in 1½" increments, thereby accomodating various ball heights on towing vehicles. Gussets 56 connect trough 10 to the trailer "bow" piece 58.

As can be seen from FIG. 3 in plan view, trough 10 tapers from back to front of the trailer, which corresponds to the tires of conventional motorcycles which have narrower width front tires 105 and wider width rear tires 103. In cross-section, trough 10 has been modified from conventional channel shape for greater strength and has upper parallel walls 62, a horizontal bottom wall 64, and diagonal walls 66 therebetween. Wedgepiece 50, however, in cross-section only has diagonal walls 68 and a horizontal bottom wall 70, and is shown particularly in FIGS. 2 and 12. If horizontal wall 70 is shorter than the width of the front tire of a motorcycle used on a trailer, the front tire 105 of the motorcycle will always wedge in wedge pieces 50. This serves two purposes: one, the wedges help retain the motorcycle in position on the trailer after it is cinched down and, two, the wedges help hold the motorcycle upright when an operator has put the motorcycle on the trailer by use of ramp 14 and before tie-down straps have been secured. Wedge pieces 50 are secured in positions in trough 10 with bolts 51 installed in selected openings among the row of openings 54. The best locations for wedges 50 depends on the size of motorcycle front tire 105.

The so-called bow piece 58 may be formed as an extension of trough 10, of the same cross-section, extending forwardly as it extends upwardly and secured to trough 10 by gussets 56. Gussets 56 are secured in place by bolts 72. The action of wedge pieces 50 and front support clamp 52, adequately holds the motorcycle up while straps 106 are being used to permanently secure the motorcycle in place. The operation of loading and unloading, thus, can be a one-person operation, as the person does not need to hold up the motorcycle and can use his hands for fastening straps 106.

The front support of clamp 52 is made from a rod formed into a bend 74 facing the tread of the front tire 105 and adjacent rod portions 76 in abutting relationship to front tire sidewalls and extending generally radially of front tire 105. From radial portions 76, support 52 extends downwardly, with a slight bend at 78, and laps opposite sides of bow piece 58. The lower rod ends of support 52 are adjustably clamped by an assembly which also secures the forward ends of tube braces 18 to bow piece 58 including triangular plate 79, a piece of metal 80 having a V-shaped clamping seat 81 for the rods and bolts 82. Support 52 can be adjusted in height to accomodate various sizes of motorcycle front tires 105.

Another function of the sloping extension 58 of trough 10 is to adjustably mount the ball coupler 12 which is secured at the forward end of tongue 48. Ball coupler 12 can be purchased from a source specializing in such couplers and can be suitably secured in the box-shaped coupling member 48. The aft end 86 of box-shaped member 48 is slanted to match the forward face of bow piece 58 and has bolts 84, extending through a small plate 85, securing coupling member 48 in selected openings 60 in member 58. With the aft end 86 of member 48 abutted to the face of bow piece 58 and with bolts 84 secured in holes 60, ball coupler 12 is securely mounted. It will be understood that balls secured to the rear ends of vehicles will vary in height and ball coupler 12 needs to be adjustable in height in order to secure to the various height balls without tipping trough 10 from its normal horizontal disposition. That is the reason why bolts 84 need to be selectively positioned in openings 60. Box-shaped coupling member 48 also may be formed as a junction box or to house a junction box to connect wires 38 contained in rubber hoses 44 and extending from each tube 18. Wires 38 connect to a conduit 88 having a plug 90 secured to its end which will be engaged in a receptacle on the vehicle providing electrical power to the lights of the trailer. Side warning lights 92 can be disposed on opposite sides of member 48 to comply with the laws requiring such lights. Suitable wiring within member 48 to connect side lights 92 to wiring 38 and 88 will be obvious. Also shown attached to coupling member 48 are chains 94 that are required as secondary securing of trailers to vehicles.

One purpose of the upward bow extension 58 of trough 10 is to provide an upper securing location 96 in bracing the support system for the motorcycle against tipping moments. It will be observed that if tube braces 18 were in the same horizontal plane as trough 10, tubes 18 would provide relatively little additional resistance against twisting of trough 10 by a motorcycle. On the other hand, the bow piece 58 provides an upper securing location 96 for the upper forward ends of tubes 18 which extends therefrom downwardly and rearwardly, in directions diverging in plan view, to secure to the outer ends of structural axle housing 22. Incidentally, the securing of tubes 18 to axle housing 22 is shown to have the form of eye bolts or nuts 98 which are also used to secure the lower ends of tie-down straps 106 extending downwardly and rearwardly from the motorcycle handlebars. With this arrangement of tube braces 18, if a motorcycle should have a turning moment about a horizontal line or axis 107 representing the bearing of its tires 103, 105 in trough 10, one tube 18 will by put in compression and the other tube 18 will by put in tension to resist such tipping of the motorcycle. This manner of bracing the trailer contributes in providing suitable strength for my trailer with about half of the weight of conventional motorcycle trailers. The bracing system is considered to be an important contribution to trailer manufacturing.

Another function of tubes 18 is to house extra electrical wiring 38. Rubber or plastic tubing 44 are of short lengths, extending between rear lights 46 and tubes 18 and extending between tubes 18 and box-shaped member 48 which acts acts as a forward junction box. Extra wiring 38 can be stored within tubes 18 and any extra length of rubber tubing 44 can be stored within the associated tube 18 merely by pushing the tubing 44 inwardly through tubular passageway 42 at the end of tube 18. Tubular passageways 42 snugly fit tubing 44. Tubular lengths 44 may be formed of any suitable flexible material.

Ramp 14 can be formed of the same type of material as trough 10 and with the same basic cross-section but it is shown to have a channel shape of less depth than trough 10. When ramp 14 is not being used for its ramp function in loading and unloading motorcycles, it can be stored in the position shown especially in FIG. 3. A pair of tube clamps 100 are mounted on tubes 18, and can be adjusted in positions under some force. Clamps 100 have upstanding bolts 102 which may be positioned in appropriate holes 104 in ramp 14. There are two staggered rows of holes 104 at each end of ramp 14 in order to provide wide adjustability. As tube clamps 100 are brough forward or rearward, the spacing of bolts 102 shorten and lengthen and match different openings 104 in ramp 14. The purpose of adjustment of positions of tube clamps 100 and hence of ramp 14, in stored position, is to form an abutment for the rear of the front tire 105 of the motorcycle which tire will vary in diameter from one motorcycle to another. The motorcycle front tire 105 is forced against ramp abutment 14 by strap tie-downs 106 between the handlebars of the motorcycle and eye bolts/nuts 98. Strap tie-downs 106 may be of conventional constructions. However, in conventional motorcycle trailers, straps 106 extend forwardly and downwardly from the motorcycle handlebars, whereas in the present trailer straps 106 extend rearwardly and downwardly form the motorcycle handlebars.

Rear lights 46 are supported at the sides of the upper ends of upright rods 101 which are supported on axle housing 22 by clips 108 in the assembly secured by eye-bolts 98, and one of these also will have a mounting 109 for a license plate. Lights 46 and license plate 14 support 109 may be moved out of the way during loading and unloading of motorcycles by pivoting about the longitudinal axis of rods 101 which are secured to clip 108 by an assembly including washers 111 welded to rods 101, including resilient washers 113, and including nuts, lock washers, etc. Resilient washers 113 tend to hold rods 10 in position but permit rotary adjustments.

Trough 10 positions motorcycle on a trailer with its front tire 105 centered forward of axle housing 22 and with its rear tire 103 centered rearward of axle housing 22. To minimize weight as well as for other desirable ends, the rear end of trough 10 is terminated as far forward as possible. In fact it is terminated very close to the portion of the rear tire 103 resting in trough 10. It will be understood that a special mounting is needed to get the ramp 14 supported from the rear ends of trough 10 without interfering with the tire 103.

The structure I have devised includes a link 16 bent from rod stock generally into a "c", meaning it has forward and aft parallel portions 110, side parallel portions 112 and a split at 114. As viewed in side view, the aft end of link 16 is downwardly bent at 115. In this way link 16 can pivot about the forward portion 110 of rod 16 should the rear end of trough 10 hit the ground. To this end, a clip member 116 in the bottom of the trough 10 pivotally engages forward rod portion 110 of link 16. On the underside of ramp 14 is a clip member 118 which engages with the aft rod portion 110 of link 16. Clip 118, it should be noted from FIGS. 1 and 4, hooks over, down and back relative to aft rod portion 110, to some extent, so that aft rod portion 110 will not escape as a motorcycle rolls up or down ramp 14. If clip 118 hooked less it could escape from engagement with link 16 or ramp 14 could rock about its longitudinal axis.

Trough 10 is secured to structural axle housing 22 by a saddle or cradle member 120 welded to structural axle housing 22 and secured to trough 10 with bolts 122. Structural axle housing 22 has an inverted U-shape and can be formed by punching or cutting and bending of a metal plate. The housing 22 is cut away to permit trough 10 to pass and saddle or cradle 120 is welded into the cutaway portion. It will be understood that the assembly of members 10, 120, 22 is appropriately strong, depending on the materials involved, their thicknesses, etc.

As seen in FIG. 3, trough or rod 10 in plan view tapers from aft end 126 to forward end 124 (or flared from forward end to aft end). One reason for the above is the narrower front tires and broader rear tires commonly found in motorcycles. In side view, trough 10 has lesser height at its forward end 124 and at its aft end 126 and a greater height in the middle 128 generally in the area of saddle or cradle 120, as best seen in FIG. 1. One reason for this is the differing strength requirements, considering the trailer construction and the loading of motorcycle, from forward to aft ends 124, 126 and in the medial region 128 of the axles. To minimize weight, it is important to vary the cross-section of trough 10 from forward to aft end according to needed strength.

Turning now to the swing axles assembly on the trailer, the two wheels 130 have conventionally mounted tires and have hubs 131 secured to swing axle members 132 which have their inner ends mounted to pivot about parallel pivotal axes 24 extending longitudinally of the trailer and generally parallel to the longitudinal axis of trough 10. Axle members 132 may be termed "swing axles". It will be understood to be important to have parallel pivot axes 24 defined by precision parts. To the extent pivotal axes 24 are out of parallel, additional tire wear would be caused. Swing axles have cross-sections in the form of inverted U-shapes with generously curved bases. The inner ends of axle members 132 have bores 136. Bores 136 are formed in sleeves 134 welded to the ends of members 132. A precision bolt 138, such as a shoulder bolt, forms the pivot for each axle arm 132 and flanged plastic bushing 30 is interposed between a bushing 140 on bolt 138 and the inner surface of the bore 136 and between the ends of sleeves 134 and the adjacent inner walls of axle housing 22. Swing axles 132 have inverted U-shaped cross-sections and the inner ends of hubs 131 are welded within the U-shaped structure. The U-shaped cross-section may be slotted at opposite sides at 137 to provide good surfaces for welding hubs 131 in place. A tension strap 139 is welded to the legs of the U-shaped swing axle cross-section and to sleeve 134 and to hub 131.

As before indicated, it would be expensive to jig bore the axle housing 22 to mount precision bolts 138 and instead the precision jig boring is accomplished in a pair of small rectangular plates 28, which have the precision bores 26. Bolts 138 actually pass through sloppy fit holes 34 in housing 22. Plates 28 are pressed to opposite sides of axle housing 22 by four bolts 142 which do not need to be precision bolts and fit in non-precision holes 32 through plates 28 and non-precision holes 144 in housing 22. Precision bolts 138 are not used for the basic function of holding the assembly together because the function of bolts 138 is to provide parallel pivotal axes and not to tense the assembly together. Reinforcing plates 141 may be disposed on the inside of axle housing 22 as a part of the securement by bolts 142.

Plates 28 rest on horizontal tension plate 36 as swing axles 132 pivot about spring members 20. In effect the rubber suspension members 20 form pivots for axle members 132 so that under load the direction of sleeves 134 attached to axle members 132 is downward. That load is accepted by the horizontal plate 36 welded to the lower edge of the inverted U-shaped axle housing 22. Stops 146 secured to the upper surface of horizontal plate 36 nears its ends limits downward swinging movements of swing axles 132. FIG. 6 indicates the limits of swinging movements of axles 132 between spring members 20 and stops 146. Spring member 20 can be formed of natural or synthetic rubber or other suitable elastomeric or plastic material of proper strength and resiliency.

The upper end of resilient spring member 20 is received between a pair of clips 148 secured by bolts 150 and between the sidewalls of the inverted U-shaped cross-section of housing 22. Thus rubber members 20 are confined by clips 148, by opposite walls of housing 22, and by swing axles 132 abutting their lower surfaces.

It will be observed that particularly from FIG. 8 that the lower surface of each resilient compression member 20 is formed with a rest 152 fitting the upper portion of the associated swing arm 132. This rest 152 in each member 20 can be concavely cured or of inverted V-shaped. In other words, in cross-section longitudinally of the trailer, the middle 158 of each member 20 is higher than the edge portions 160 to define rest 152. Note that the opposite walls of housing 22 support the opposite sides of each spring member 20. This means that any loads tending to pivot swing axles 132 horizontally about their inner ends 134 will be resisted by the opposite edge portions 160 of rest 152. Further, stabilizer plugs 23, set in rings 25 welded to opposite sides of swing axles 132, are positioned to bear on opposite walls of axle housing 22 to accept horizontal swing loadings.

This structure provides fore and aft resistance to fore and aft loads applied to axle members 132 by road irregularities, hazards, etc.

It will be observed that for the low loadings of a motorcycle trailer, the swing axle assembly disclosed provides spring suspension and sufficient strength and yet the spring axle assembly is of most economical construction.

Having thus described my invention, I do not wish to be understood as limiting myself to the exact details of instruction shown and described. Instead, I wish to cover those modifications thereof which will occur to those skilled in the art upon learning of my invention, and which properly fall within the scope of my invention.

I claim:

1. In a two wheel trailer, the improvement in mounting of said wheels, comprising:
   (a) a swing axle extending laterally of the trailer at either side having at one end one of said wheels mounted thereon and a pivotal mounting on said trailer for the other end of each axle on opposite sides of said trailer, said pivotal mountings being oriented so said axles will pivot about axes parallel to the longitudinal axis of said trailer and,
   (b) means supporting a resilient rubber pad above each axle against which said axle directly bears to perform a spring and pivot function.

2. The subject matter of claim 1 in which said resilient pad is located in the middle portion of each axle.

3. The subject matter of claim 2 in which each pad in cross-section longitudinally of said trailer has a rest which has a higher middle portion and lower outer portions so that pivoting of said axles fore and aft of said trailer is resisted by said rest.

4. The subject matter of claim 1 in which said axle is of inverted U-shaped cross-section.

5. The subject matter of claim 4 in which there is a sleeve inset and welded to the inner end of each axle and a bolt positioned in each sleeve whereby said sleeve and bolt form part of the pivotal mounting of each swing arm.

6. The subject matter of claim 4 in which there is a hub disposed at the outer end of each swing axle having its inner end secured within the U-shape of the axle cross-section, opposite walls of the cross-section being slotted to facilitate locating a weld between said hub and said axle at diametrically opposite points, there being a tension strap at the bottom of each swing axle cross-section welded to opposite walls of said axle, to said hub and to said sleeve.

7. In a two wheel trailer, the improvement in mounting of said wheels, comprising:
   (a) a swing axle extending laterally of the trailer at either side having at one end one of said wheels mounted thereon and a pivotal mounting on said trailer for the other end of each axle on opposite sides of said trailer, said pivotal mountings being oriented so that said axles will pivot about axes parallel to each other and parallel to the longitudinal axis of said trailer, and
   (b) a housing extending laterally of said trailer and a pair of vertical plates separate from and abutting forward and rear sides of said housing and said pivotal mountings for the other ends of said axles being provided by precision drilled pairs of openings in said plates and precision bolts mounted in said pairs of openings to insure that said axes will be parallel.

8. The subject matter of claim 7 in which said housing has generously sized openings to pass said precision bolts, and said housing and said plates having non-precision openings and non-precision bolts to hold said plates in place on said housing.

9. The subject matter of claim 7 in which said housing supports a resilient rubber pad above the middle part of each axle against which said axle directly bears to perform a spring and pivot function, said pads forming fulcrums about which said pads pivot so that the force said axles apply on said plates is downward.

10. The subject matter of claim 9 in which each pad in cross-section longitudinally of said trailer has a rest which has a higher middle portion and lower outer portions so that pivoting of said axles fore and aft of said trailer is resisted by said rest.

11. The subject matter of claim 10 in which said housing has an inverted U-shaped cross-section and each pad fitting within said U-shaped cross-section whereby the lower outer portions of said rest is supported by the sidewalls of the inverted U-shaped cross-section of said housing axles.

12. The subject matter of claim 7 in which said housing has an inverted U-shaped cross-section and each swing axle has on the sides thereof stabilizer members in position to bear on the inner side surfaces of the inverted U-shaped housing cross-section to resist swinging of said axles in a horizontal plane.

13. The subject matter of claim 12 in which said stabilizer members include supporting rings secured to the sides of each axle and plastic buttons disposed in said rings to bear on said inner side surfaces.

14. The subject matter of claim 7 in which said housing has a horizontal plate secured to the lower surface thereof and said vertical plates bearing on said horizontal plate as they are pressed downwardly by force applied through said axles.

* * * * *